(12) United States Patent
Sakurai et al.

(10) Patent No.: US 7,957,857 B2
(45) Date of Patent: Jun. 7, 2011

(54) DIRECTION GUIDING APPARATUS AND DIRECTION GUIDING METHOD

(75) Inventors: Satoshi Sakurai, Shinagawa (JP); Takuya Uchiyama, Shinagawa (JP); Shinichiro Akieda, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 889 days.

(21) Appl. No.: 11/978,675

(22) Filed: Oct. 30, 2007

(65) Prior Publication Data
US 2008/0319598 A1 Dec. 25, 2008

(30) Foreign Application Priority Data

Jun. 20, 2007 (JP) ................. 2007-162632

(51) Int. Cl.
*G01D 13/22* (2006.01)
*G06F 19/00* (2006.01)

(52) U.S. Cl. ............... 701/23; 701/301; 340/903

(58) Field of Classification Search ............... 701/23, 701/300, 301; 340/903, 435, 436, 944, 407.1; 74/471 XY; 116/205; 369/44.32
See application file for complete search history.

(56) References Cited

U.S. PATENT DOCUMENTS

| | | | |
|---|---|---|---|
| 6,320,496 B1 * | 11/2001 | Sokoler et al. | 340/407.1 |
| 7,456,729 B2 * | 11/2008 | Khoury | 340/407.1 |
| 2002/0021634 A1 * | 2/2002 | Choi | 369/44.32 |

FOREIGN PATENT DOCUMENTS

| | | |
|---|---|---|
| JP | 2000-352521 | 12/2000 |
| JP | 2004-177360 | 6/2004 |
| JP | 2005-352258 | 12/2005 |

* cited by examiner

*Primary Examiner* — Tan Q Nguyen
(74) *Attorney, Agent, or Firm* — Staas & Halsey LLP (57) ABSTRACT

The present invention discloses a direction guiding apparatus for indicating a guidance direction to a user. The direction guiding apparatus includes an operation device having an operations part movable on an operation plane, and a control part for transmitting control data to the operation device for controlling the movement of the operations part. The guidance direction is distinguishable by the movement of the operations part.

16 Claims, 12 Drawing Sheets

DIRECTION GUIDING APPARATUS AND DIRECTION GUIDING METHOD

BACKGROUND OF THE INVENTION

1. Field of the Invention

The present invention generally relates to a direction guiding apparatus and a direction guiding method, and more particularly to a direction guiding apparatus and a direction guiding method for indicating and guiding, for example, a traveling direction by tactile sense.

2. Description of the Related Art

As a typical method used for direction guidance, there is, for example, a navigation method using GPS (Global Positioning System). For example, this method typically relies on the sense of sight or hearing by displaying guidance on a display apparatus or announcing guidance through an audio apparatus.

However, guidance of directions using the sense of touch (i.e. tactile sense) can be conveyed more intuitively. As for apparatuses which convey advancing directions by using tactile sense, there are, for example, an apparatus for intuitively comprehensively conveying guidance of directions by using sense of force (force-sensitive apparatus), an apparatus using tactile sense for transmitting information of rotary movement or reciprocal movement with a contactor, or an apparatus activating a tactile-sense-surface for suggesting advancing directions to the user (For example, see Japanese Laid-Open Patent Application Nos. 2004-177360, 2005-352258, and 2000-352521).

Nevertheless, with the conventional apparatuses using tactile sense, the guided advancing direction and the direction opposite to the guided advancing direction cannot be clearly distinguished. The guided advancing direction could be recognized more reliably if the guided advancing direction and the direction opposite to the guided advancing direction could be distinguished.

SUMMARY OF THE INVENTION

The present invention may provide a direction guiding apparatus and a direction guiding method that substantially obviate one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by a direction guiding apparatus and a direction guiding method particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a direction guiding apparatus for indicating a guidance direction to a user, the direction guiding apparatus including: an operation device having an operations part movable on an operation plane; and a control part for transmitting control data to the operation device for controlling the movement of the operations part; wherein the guidance direction is distinguishable by the movement of the operations part.

Furthermore, another embodiment of the present invention provides a direction guiding method for indicating a guidance direction to a user, the direction guiding method including the steps of: a) moving an operations part of an operation device on an operation plane; b) transmitting control data to the operation device for controlling the movement of the operations part; wherein the guidance direction is distinguishable by the movement of the operations part.

Other objects and further features of the present invention will be apparent from the following detailed description when read in conjunction with the accompanying drawings.

DESCRIPTION OF THE PREFERRED EMBODIMENTS

In the following, embodiments of the present invention are described with reference to the accompanying drawings.

Figure 1:
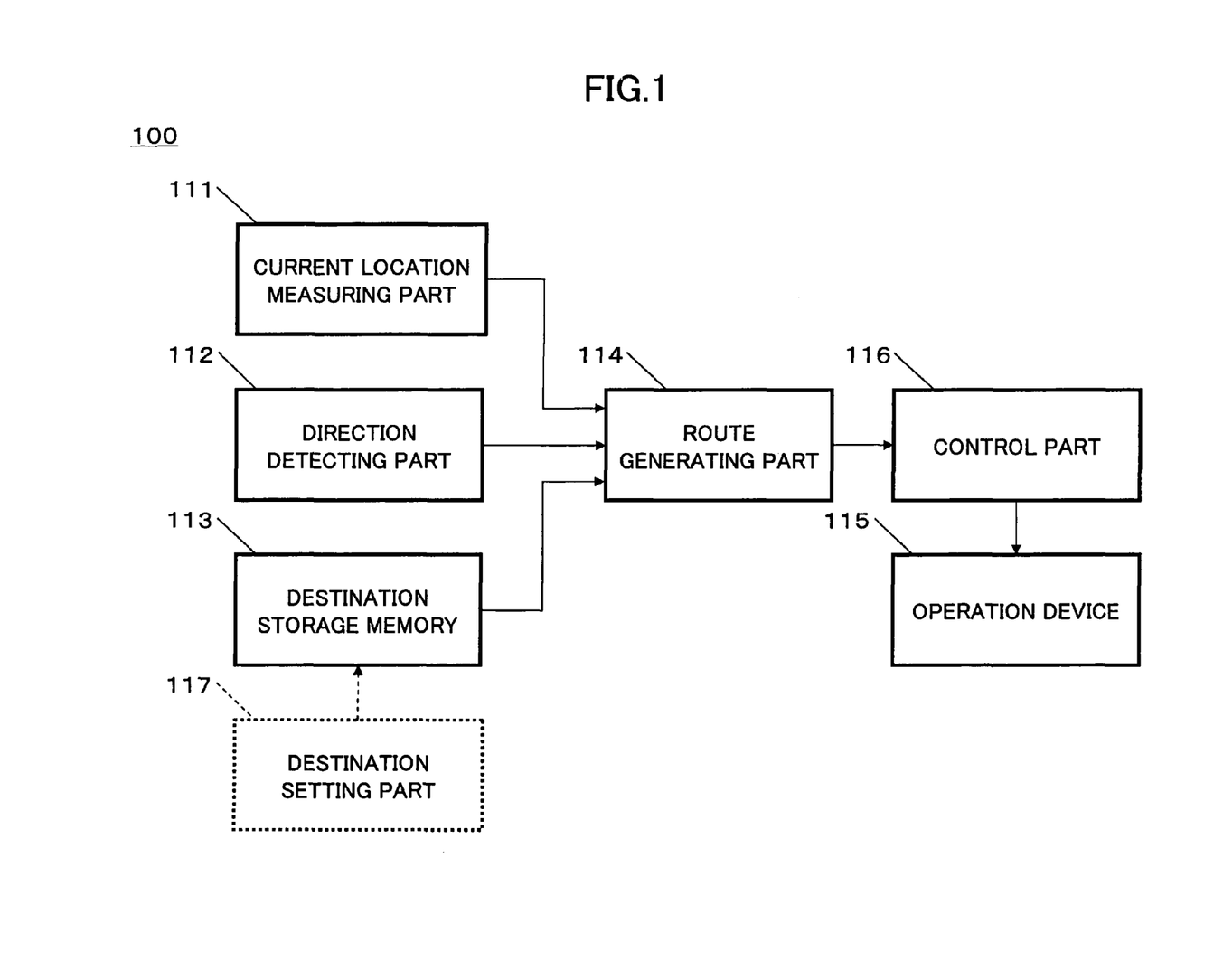
FIG. 1 is a schematic diagram showing an exemplary configuration of a direction guiding apparatus according to an embodiment of the present invention.

FIG. 1 is a schematic diagram showing an exemplary configuration of a direction guiding apparatus 100 according to an embodiment of the present invention.

The direction guiding apparatus 100 includes a current location measuring part 111, a direction detecting part 112, a destination storage memory 113, a route generating part (route calculating part) 114, an operation device 115, and a control part 116.

The current location measuring part 111 is for measuring a current location by using, for example, GPS (Global Positioning System). The data of the current location (current location data) measured by the current location measuring part 111 are provided to the route generating part 114.

The direction detecting part 112 is for detecting direction. The direction detection part includes, for example, a goniometer or a gyro. It is to be noted that the direction detecting part 112 may detect direction based on a log of routes. The direction data detected by the direction detection part 112 are provided to the route generating part 114.

The destination storage memory 113 is for storing location data of a destination(s) therein. The location data stored in the destination storage memory 113 can be changed by a destination setting part 117. The location data of the destination (destination data) stored in the destination storage memory 113 are provided to the route generating part 114.

The route generating part 114 is for calculating (generating) a route(s) based on the current location data measured by the current location measuring part 111, the direction data detected by the direction detecting part 112, and the destination data read out from the destination storage memory 113, and generating guidance direction data based on the calculated route. The guidance direction data are provided to the control part 116.

The control part 116 is for generating control data (driving signals) for driving the operation device 115 based on the guidance direction data provided from the route generating part 114. The generated control data (driving signals) are provided to the operation device 115. As described in detail below, the control data include, for example, return control data for forcing an operations part 122 of the operation device 115 to return to a guidance direction axis when the operations part 122 is detected deviating from the guidance direction axis, or tactile sense control data enabling the operations part 122 to convey a tactile sense indication to the user.

The operation device 115 includes, for example, a tactile sense device (also referred to as a tactile sense actuator). The operation device 115 is for driving (moving) the operations part 122 on an X-Y plane (operation plane 500) based on the control data (driving signals) from the control part 116. By touching the operations part 122, the user can recognize (distinguish) the movement of the operations part 122.

Furthermore, the operation device 115 can detect the location coordinates of the operations part 122 and generate a reactive force in a predetermined direction in correspondence with the detected location coordinates of the operations part 122. Thereby, when the operations part 122 is moved by the user, a reactive force corresponding to the moved-to location is generated. Accordingly, the user can recognize (distinguish) a movable direction(s) by tactilely sensing the reactive force.

The control part 116 includes, for example, a microcomputer. The control part 116 is for controlling the operation device 115 based on the guidance direction data generated in the route generating part 114.

Next, an example of the operation device 115 is described.

Figure 2:
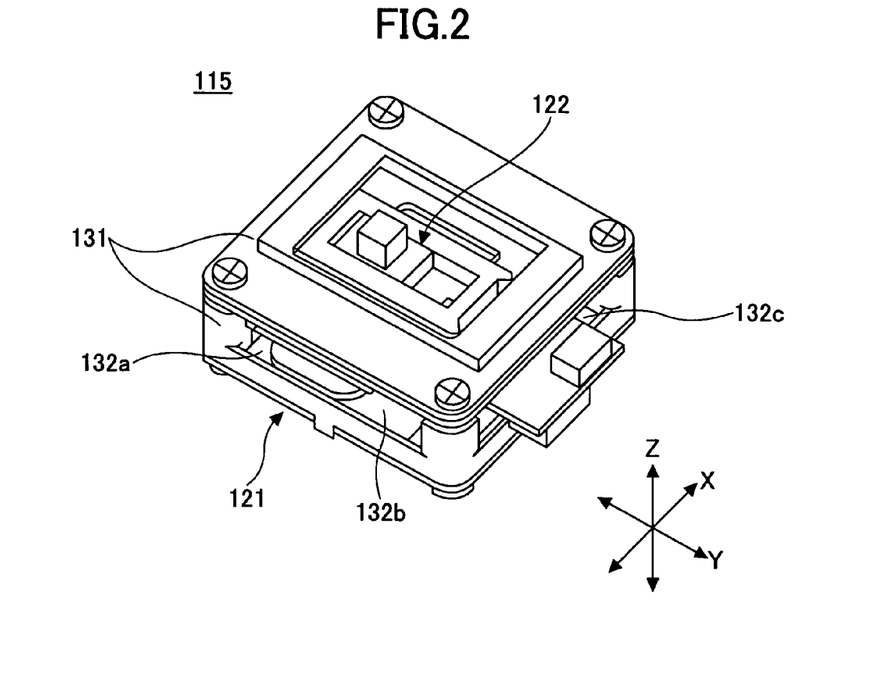
FIG. 2 is a perspective view showing an operation device according to an embodiment of the present invention.
Figure 3:
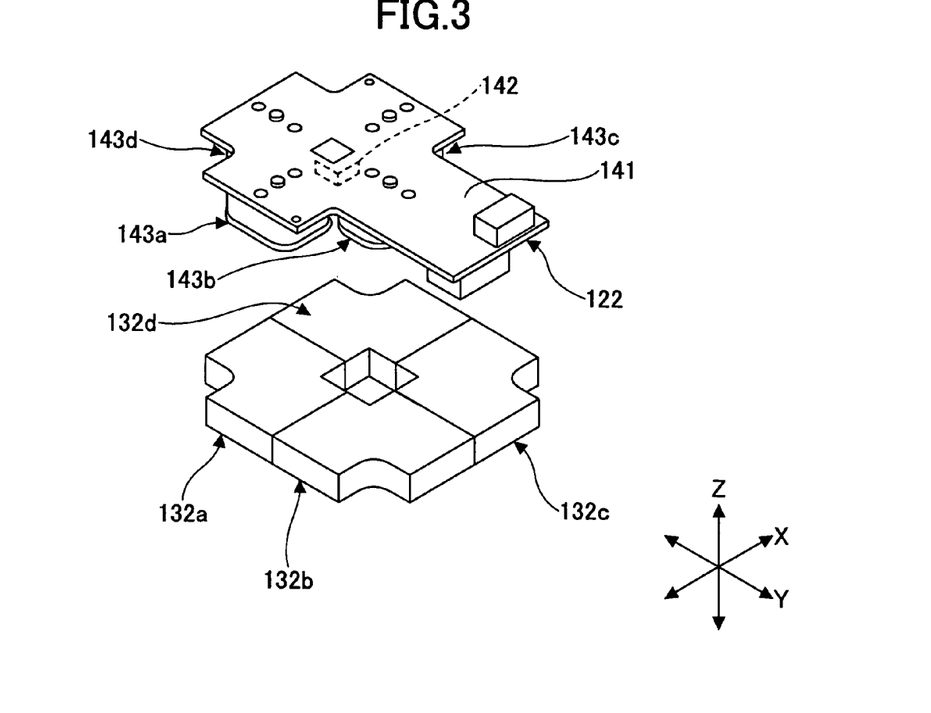
FIG. 3 is an exploded perspective view showing an operation device 115 according to an embodiment of the present invention.
Figure 4:
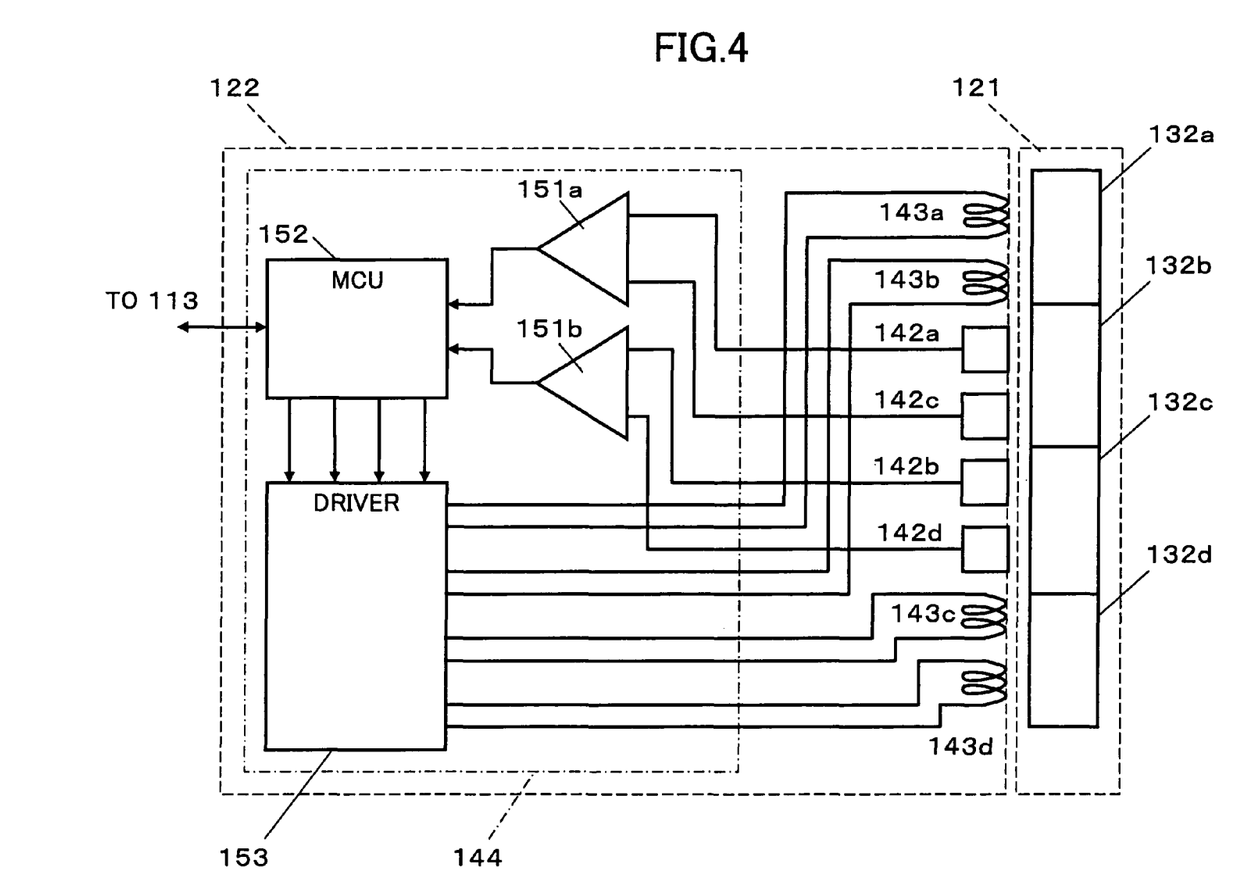
FIG. 4 is a block diagram showing a portion of an operations part 122 according to an embodiment of the present invention.
Figure 5:
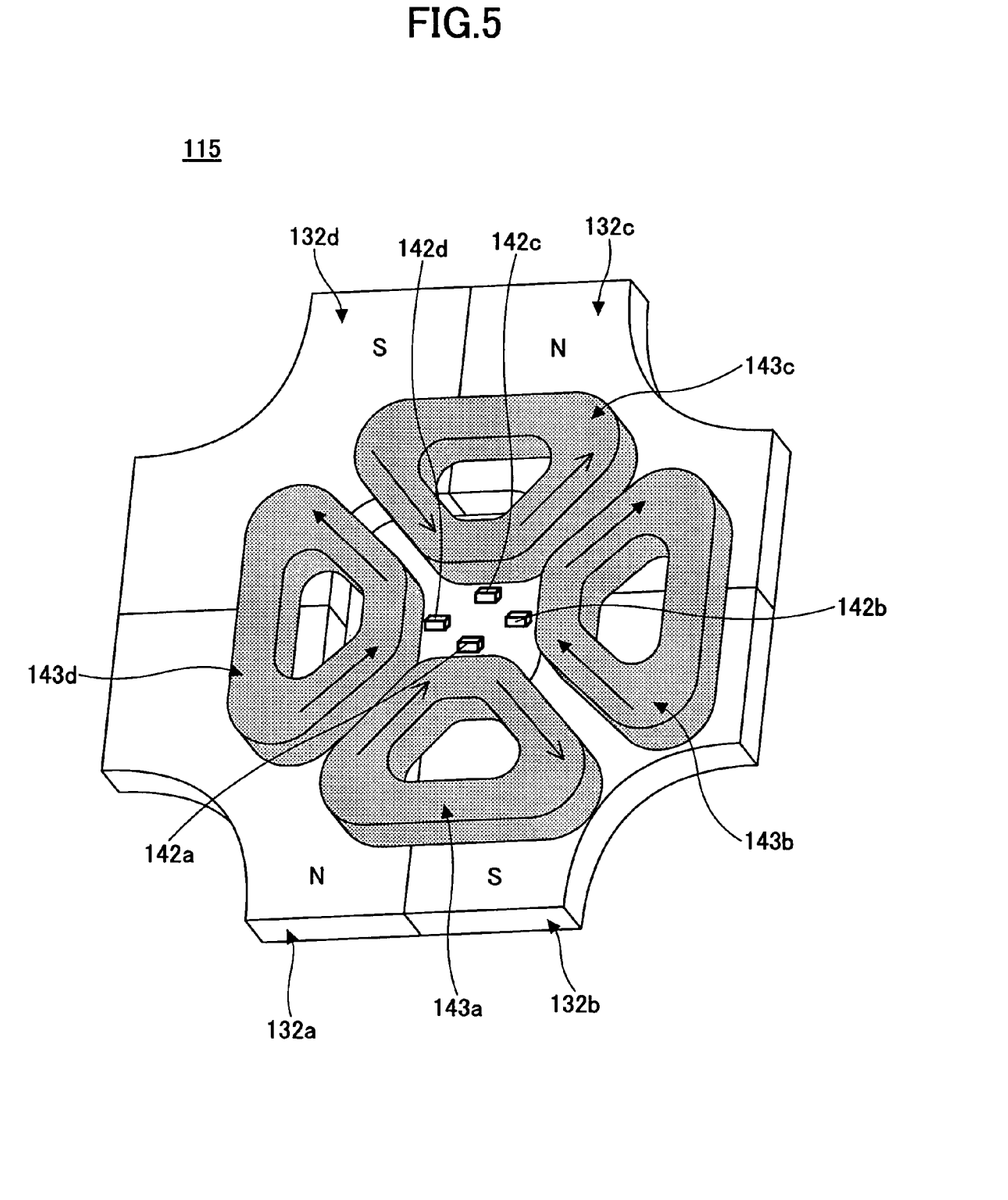
FIG. 5 is a schematic diagram for describing an operation of an operation device according to an embodiment of the present invention.

FIG. 2 is a perspective view showing an example of the operation device 115. FIG. 3 is an exploded perspective view showing an example of the operation device 115. FIG. 4 is a block diagram showing a portion of the operations part 122 according to an embodiment of the present invention. FIG. 5 is a schematic diagram for describing an operation of the operation device 115 according to an embodiment of the present invention.

As described above, the operation device 115 includes a tactile sense device (also referred to as a tactile sense actuator) and is for driving the operations part 122 on an X-Y plane (operation plane 500) based on the driving signals (control data) from the control part 116.

The operation device 115 has a fixing part 121 for fixing plural magnets 132a, 132b, 132c, 132d to a frame 131. The magnets 132a, 132b, 132c, 132d are annularly fixed to the frame 131 on an X-Y plane. In this example, the magnets 132a, 132b, 132c, 132d form a plane and are arranged so that adjacent magnets of the magnets 132a, 132b, 132c, 132d have a magnetic pole in a Z-direction (direction perpendicularly intersecting the X-Y plane) while having a polarity different from each other (for example, see FIG. 5).

The operations part 122 according to an embodiment of the present invention has a hole IC 142, plural coils 143a, 143b, 143c, 143d, and a controller 144 mounted on a circuit board (for example, see FIGS. 3 and 4).

The hole IC 142 in this example has four hole elements 142a, 142b, 142c, 142d mounted thereto. The hole elements 142a, 142b, 142c, 142d are connected to the controller 144.

The controller 144 includes AMPs 151a, 151b, an MCU 152, and a driver 153. The AMP 151a is for outputting the difference between the output of the hole element 142a and the output of hole element 142c. In this example, the hole elements 142a and 142c are arranged in a X-axis direction. The signal(s) output from the AMP 151a correspond to the X-axis location with respect to the fixing part 121 of the operations part 122.

The AMP 151b is for outputting the difference between the output of the hole element 142b and the output of hole element 142d. In this example, the hole elements 142b and 142d are arranged in a Y-axis direction. The signal(s) output from the AMP 151b corresponds to the Y-axis location with respect to the fixing part 121 of the operations part 122.

The outputs of the AMPs 151a, 152b are supplied to the MCU 152. The MCU 152 is for generating location data with respect to the fixing part 121 of the operations part 122 according to the outputs from the AMPs 151a, 152b and supplying the generated location data to the control part 116.

Furthermore, the MCU 152 is for supplying a driving signal(s) to the driver 153 based on drive commands (control data) supplied from the control part 116.

The driver 153 is for supplying drive current to the coils 143a, 143b, 143c, and 143d based on drive signals from the MCU 152. The coils 143a, 143b, 143c, 143d are arranged in a manner facing the magnets 132a, 132b, 132c, and 132d, so that the coil 143a is placed across the magnet 132a and the magnet 132b, the coil 143b is placed across the magnet 132b and the magnet 132c, the coil 143c is placed across the magnet 132c and the magnet 132d, and the coil 143d is placed across the magnet 132d and the magnet 132a (for example, see FIG. 5). Thereby, the magnets 132a, 132b, 132c, 132d and the coils 143a, 143b, 143c, 143d are arranged to form a configuration of a voice coil motor driven on the X-Y plane.

With the above-described configuration, the operations part 122 is moved on the X-Y plane by supplying drive current to the coils 143a, 143b, 143c, and 143d.

Figure 6:
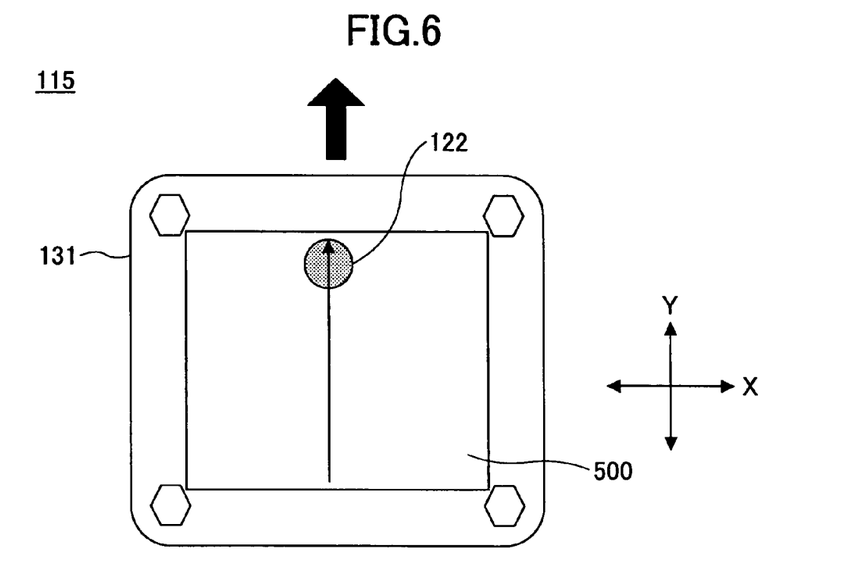
FIG. 6 is a schematic diagram for describing an operation of guiding directions with an operations part according to an embodiment of the present invention.

FIG. 6 is a schematic diagram for describing an operation of guiding directions with the operations part 122 according to an embodiment of the present invention.

The operations part 122 is linearly reciprocally moved in a guidance direction according to the driving signals supplied from the MCU 152. In moving the operations part 122, the MCU 152 controls the operations part 122 so that the moving speed of the operations part 122 is different for an advancing direction (i.e. outbound path) and a returning direction (i.e. inbound path) which is the opposite of the advancing direction. For example, the moving speed for the advancing direction (outbound path) may be faster than the moving speed for the returning direction (inbound path). In another example, the moving speed for the advancing direction (outbound path) may be slower than the moving speed for the returning direction (inbound path). Based on the difference of moving speed, the user can surely recognize (distinguish) the advancing direction.

Figure 7:
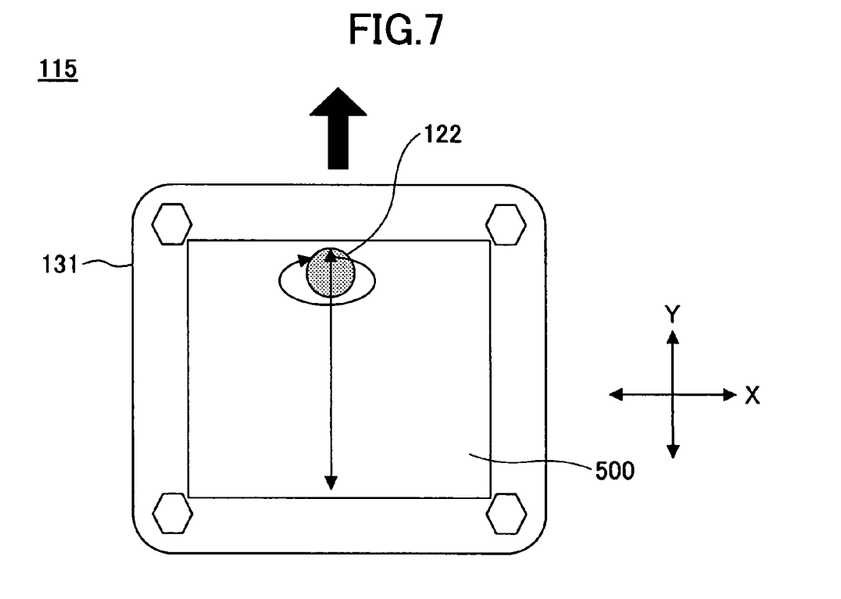
FIG. 7 is a schematic diagram for describing a first modified operation of guiding directions with an operations part according to an embodiment of the present invention.

FIG. 7 is a schematic diagram for describing a first modified operation of guiding directions with the operations part 122 according to an embodiment of the present invention.

In this first modified operation, the operations part 122, in addition to being linearly reciprocally moved in a guidance direction, is non-linearly moved at one of the ends of the path of the guidance direction according to the driving signals supplied from the MCU 152. The non-linear movement performed at one end of the path of the guidance direction is, for example, an elliptical or circular rotary movement. Thereby, the user can recognize (distinguish) the one end of the path of the guidance direction and recognize (distinguish) which direction of the linear reciprocal movements is the guidance direction. The non-linear movement performed at one end of the path of the guidance direction has significantly smaller stroke than that of the linear reciprocal movement. Accordingly, the user can surely recognize the end of the path of the linear reciprocal movement.

It is to be noted that the one end of the path of the guidance direction may indicate the advancing direction or the returning direction the opposite of the advancing direction.

In this first modified operation, the moving speed of the linear reciprocal movement in the guidance direction may also be different for an advancing direction (i.e. outbound path) and a returning direction (i.e. inbound path). For example, the moving speed for the advancing direction (outbound path) may be faster than the moving speed for the returning direction (inbound path). In another example, the moving speed for the advancing direction (outbound path) may be slower than the moving speed for the returning direction (inbound path). Accordingly, the user can more surely recognize the one end of the path of the guidance direction. Thereby, the user can recognize (distinguish) which direction of the linear reciprocal movement is the guidance direction.

Figure 8:
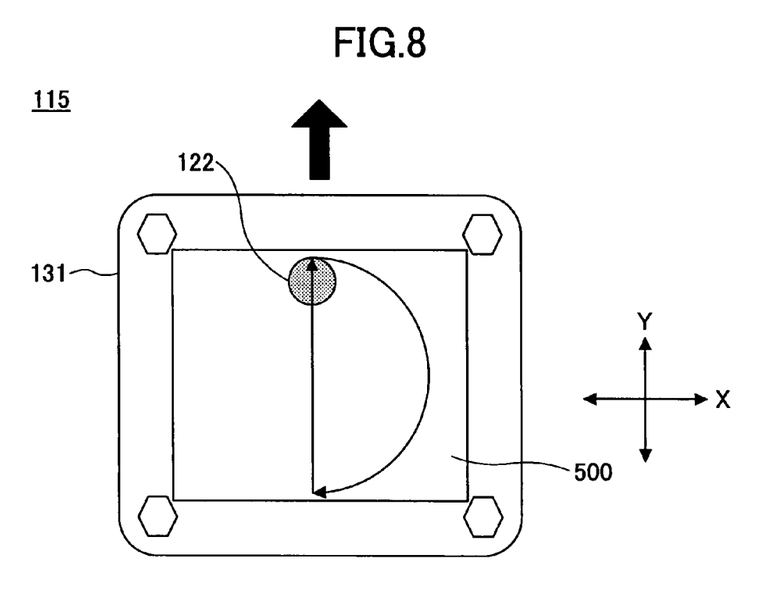
FIG. 8 is a schematic diagram for describing a second modified operation of guiding directions with an operations part according to an embodiment of the present invention.

FIG. 8 is a schematic diagram for describing a second modified operation of guiding directions with the operations part 122 according to an embodiment of the present invention.

In this second modified operation, the operations part 122 is linearly moved with respect to the guidance direction and arcuately moved with respect to the opposite direction of the guidance direction according to driving signals from the MCU 152. In this case, the user can recognize (distinguish) that the user is heading in the guidance direction by the linear movement of the operations part 122 and that the user is heading in the opposite direction of the guidance direction by the arcuate movement of the operations part 122.

It is to be noted that a non-linear movement may also be performed at one of the ends of path of the linear movement or the arcuate movement. The non-linear movement performed at the one end is, for example, an elliptical or circular rotary movement. Thereby, the user can recognize (distinguish) the one end of the path of the guidance direction and recognize which direction of the linear reciprocal movements is the guidance direction.

Figure 9:
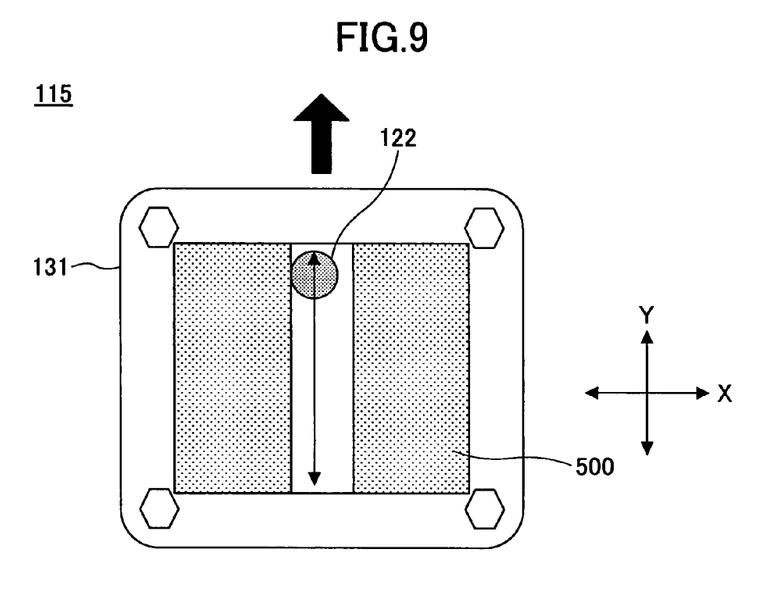
FIG. 9 is a schematic diagram for describing a third modified operation of guiding directions with an operations part according to an embodiment of the present invention.

FIG. 9 is a schematic diagram for describing a third modified operation of guiding directions with the operations part 122 according to an embodiment of the present invention.

In this third modified operation, the operations part 122 can be freely moved with respect to the guidance direction. However, whenever the operations part 122 deviates from an axis of the guidance direction (guidance direction axis), the operations part 122 is controlled by a force causing the operations part 122 to return to the guidance direction axis.

In controlling the operations part 122, the MCU 152 detects the operation location data of the operation 122 based on the output form the AMPs 151*a*, 151*b* and supplies drive current to the coils 143*a*, 143*b*, 143*c*, and 143*d* according to the detected operation location data. In a case where the operations part 122 is situated on the guidance direction axis, no current is supplied to the coils 143*a*, 143*b*, 143*c*, and 143*d*, such that the operations part 122 can stop in a free state with respect to the fixing part 121. Meanwhile, in a case where the operations part 122 deviates from the guidance direction axis, a reactive force for returning the operations part 122 to the guidance direction axis is applied to the operations part 122 by supplying current to the coils 143*a*, 143*b*, 143*c*, and 143*d*.

Figure 10:
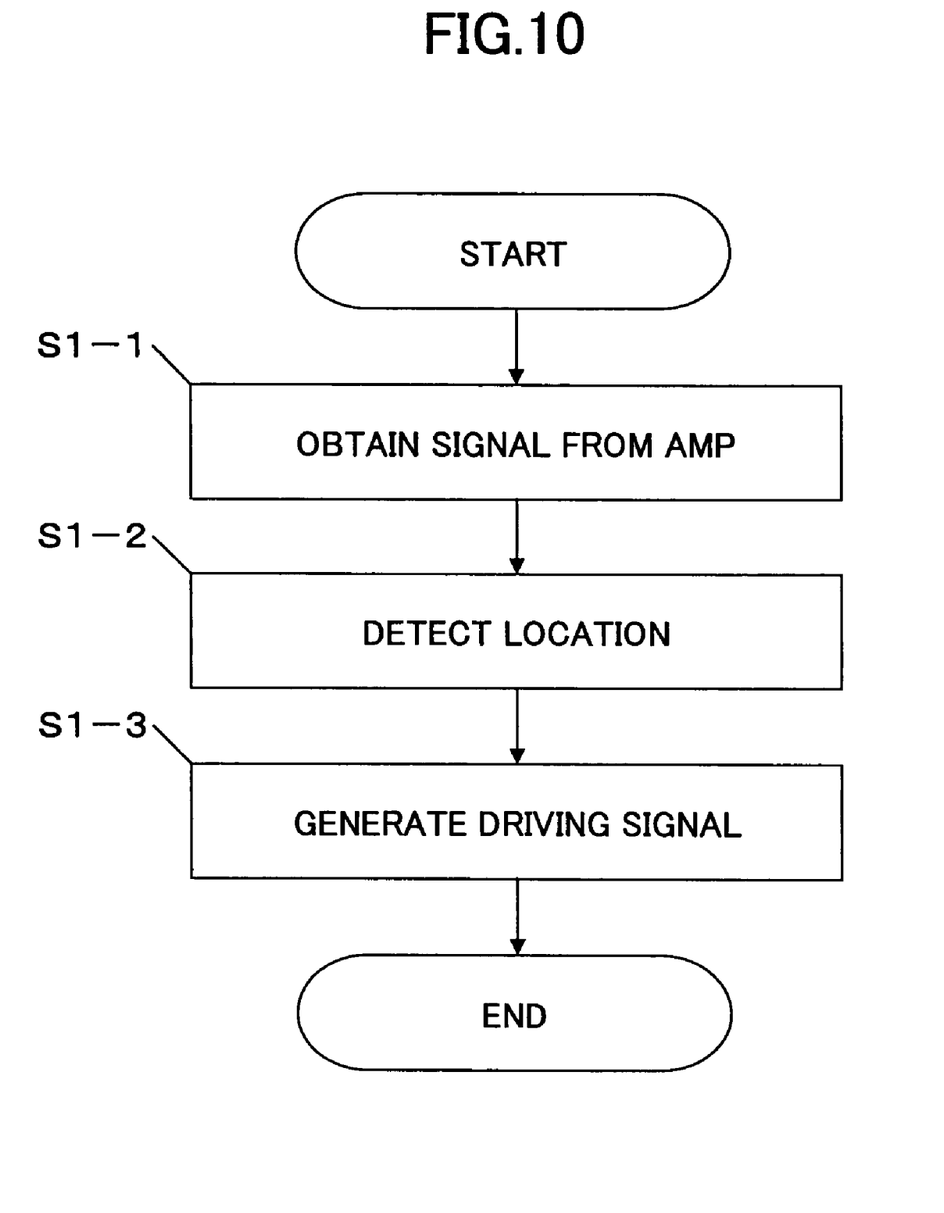
FIG. 10 is a flowchart for describing a direction guidance process performed by a MCU in a case of using the third modified operation of guiding directions with the operations part according to an embodiment of the present invention.

FIG. 10 is a flowchart for describing a direction guidance process performed by the MCU 152 in a case of using the third modified operation of guiding directions with the operations part 122 according to an embodiment of the present invention.

In Step S1-1, the MCU 152 obtains signals from the AMPs 151*a*, 151*b*. In Step S1-2, the MCU 152 detects the location of the operations part 122 (operation location) based on the signals obtained from the AMPs 151*a*, 151*b*.

In Step S1-3, the MCU 152 generates driving signals (control signals) and supplies the generated driving signals to the driver 153 in correspondence with the drive current to be supplied to the coils 143*a*, 143*b*, 143*c*, and 143*d* according to the location of the operations part 122.

Thereby, a reactive force is generated and applied to the operations part 122 according to the location of the operations part 122 so that the user can recognize (distinguish) the guidance direction axis. Furthermore, vibration may be generated and applied to the operations part 122 when the operations part 122 is located at one end of the guidance direction axis (path of guidance direction). Thereby, the user can recognize (distinguish) the guidance direction.

Figure 11:
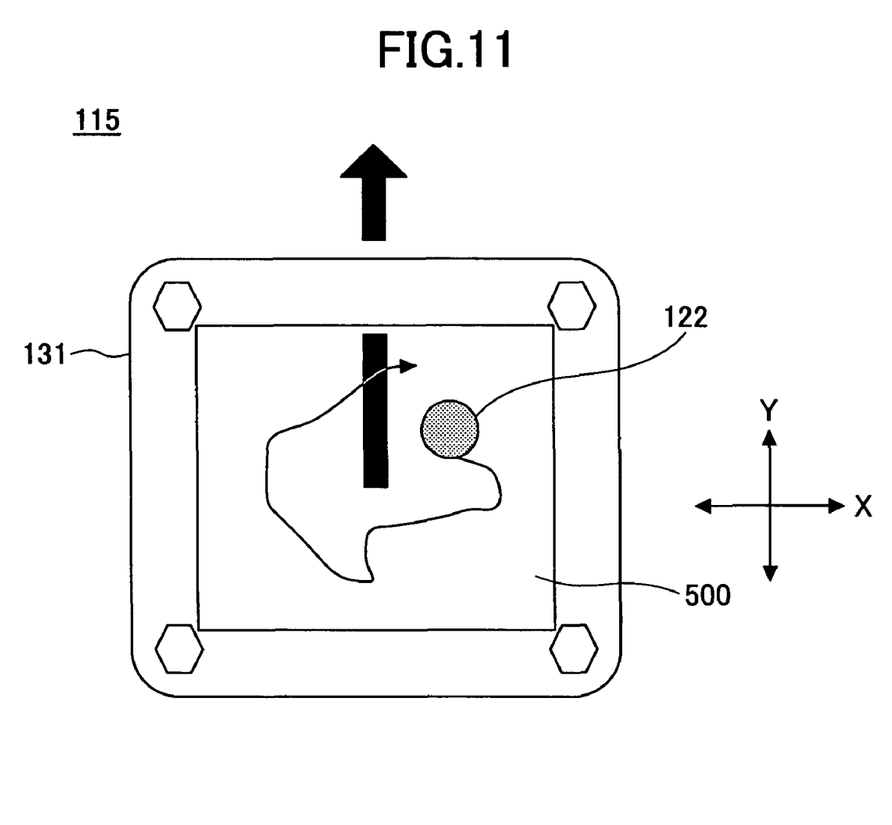
FIG. 11 is a schematic diagram for describing a fourth modified operation of guiding directions with an operations part according to an embodiment of the present invention.

FIG. 11 is a schematic diagram for describing a fourth modified operation of guiding directions with the operations part 122 according to an embodiment of the present invention.

In this fourth modified operation, when the MCU 152 detects that the operations part 122 is located on a guidance direction axis extending from the center of the operation plane toward the guidance direction, the MCU supplies current to the coils 143*a*, 143*b*, 143*c*, and 143*d* for vibrating the operations part 122. Thereby, the user can recognize (distinguish) the guidance direction by the vibration.

Figure 12:
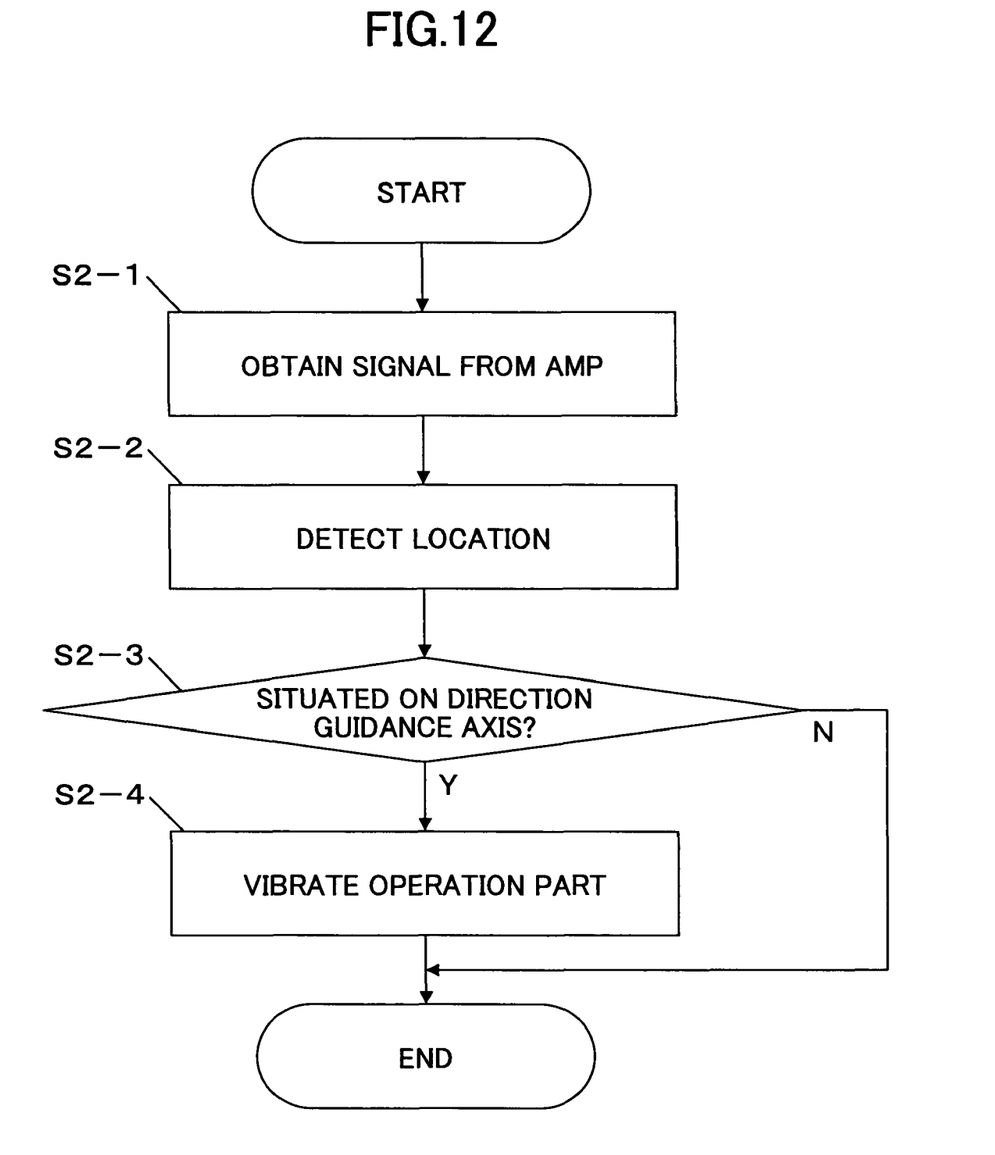
FIG. 12 is a flowchart for describing a direction guidance process performed by a MCU in a case of using the fourth modified operation of guiding directions with the operations part according to an embodiment of the present invention.

FIG. 12 is a flowchart for describing a direction guidance process performed by the MCU 152 in a case of using the fourth modified operation of guiding directions with the operations part 122 according to an embodiment of the present invention.

In Step S2-1, the MCU 152 obtains signals from the AMPs 151*a*, 151*b*. In Step S2-2, the MCU 152 detects the location of the operations part 122 (operation location) based on the signals obtained from the AMPs 151*a*, 151*b*.

In Step S2-3, the MCU 152 determines whether the detected location of the operations part 122 is situated on the direction guidance axis. In a case where the detected location of the operations part 122 is situated on the direction guidance axis (Yes in Step S2-3), the MCU 152 supplies drive current to the coils 143a, 143b, 143c, and 143d via the driver 153 for enabling the control part 122 to convey a tactile sense indication to the user. The tactile sense indication is, for example, vibration. In a case where the detected location of the operations part 122 is not situated on the direction guidance axis (No in Step S2-3), the MCU 152 ends the process without supplying drive current to the coils 143a, 143b, 143c, and 143d.

Accordingly, by recognizing the guidance direction axis from the vibration of the operations part 122, the user can recognize (distinguish) the guidance direction.

Figure 13:
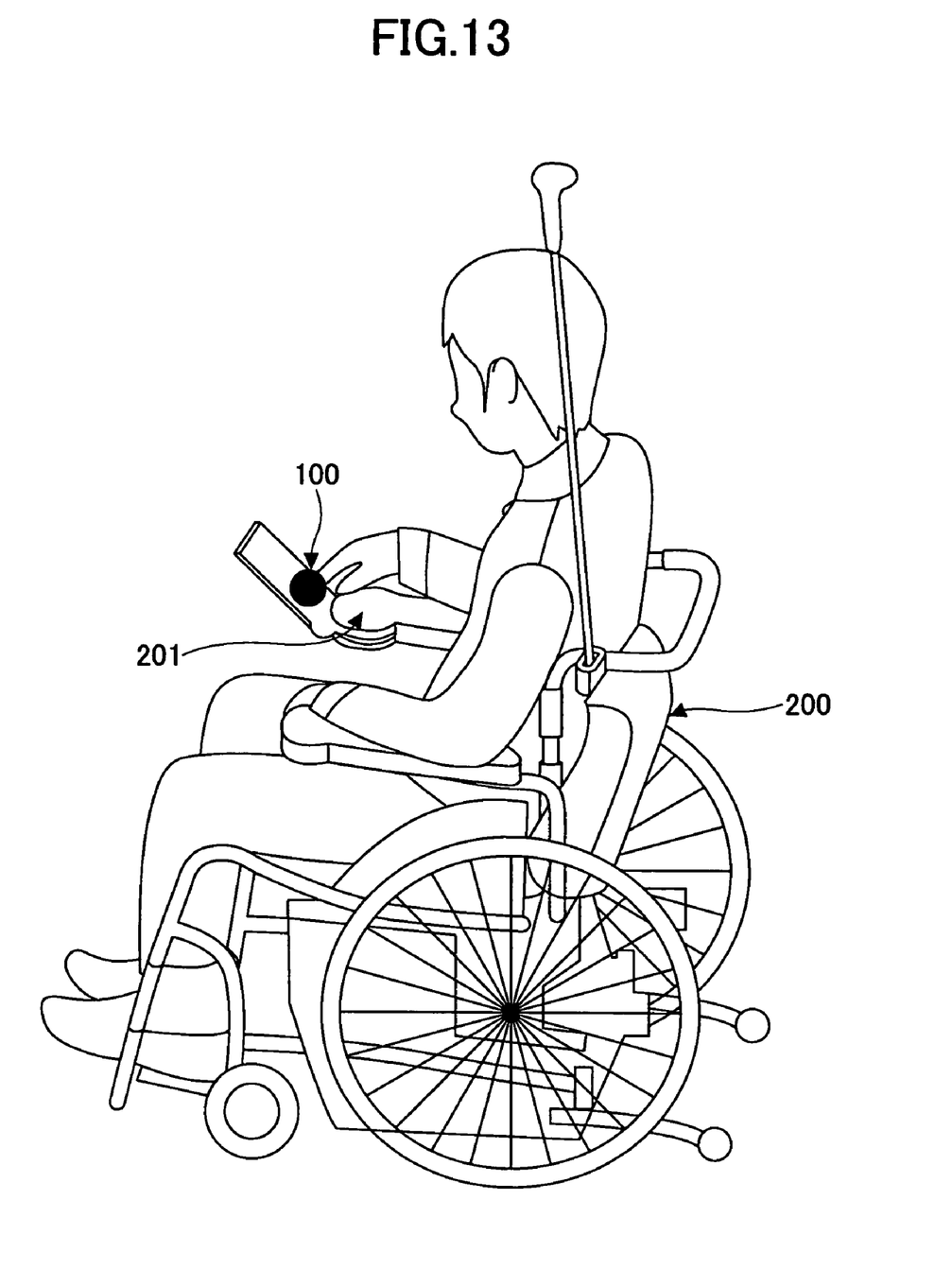
FIG. 13 is a schematic diagram showing a first example applying an embodiment of the present invention.

FIG. 13 is a schematic diagram showing a first example applying an embodiment of the present invention. In this example, an embodiment of the direction guiding apparatus 100 is mounted on an arm rest 201 of a wheel chair 200.

Figure 14:
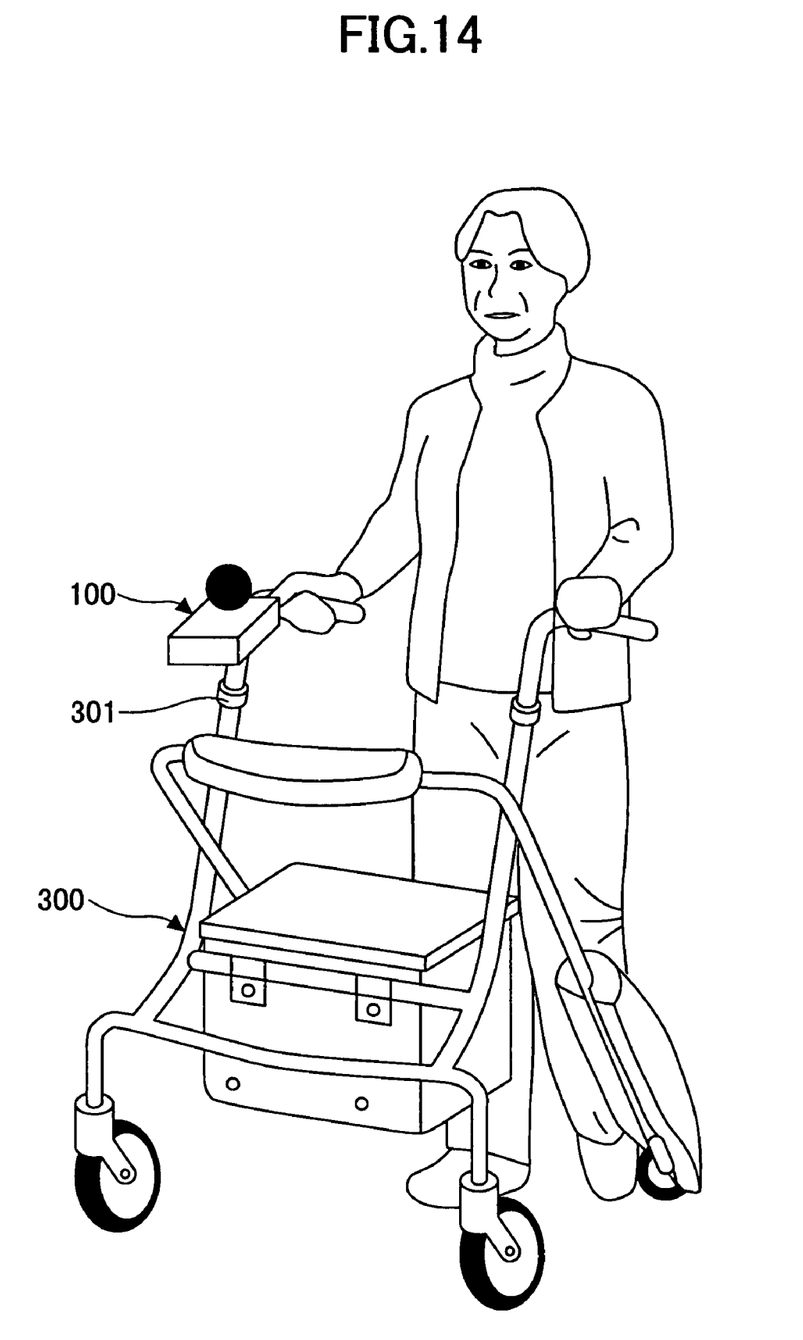
FIG. 14 is a schematic diagram showing a second example applying an embodiment of the present invention.

FIG. 14 is a schematic diagram showing a second example applying an embodiment of the present invention. In this example, an embodiment of the direction guiding apparatus 100 is mounted on a handle 301 of a wheeled walker 300.

Figure 15:
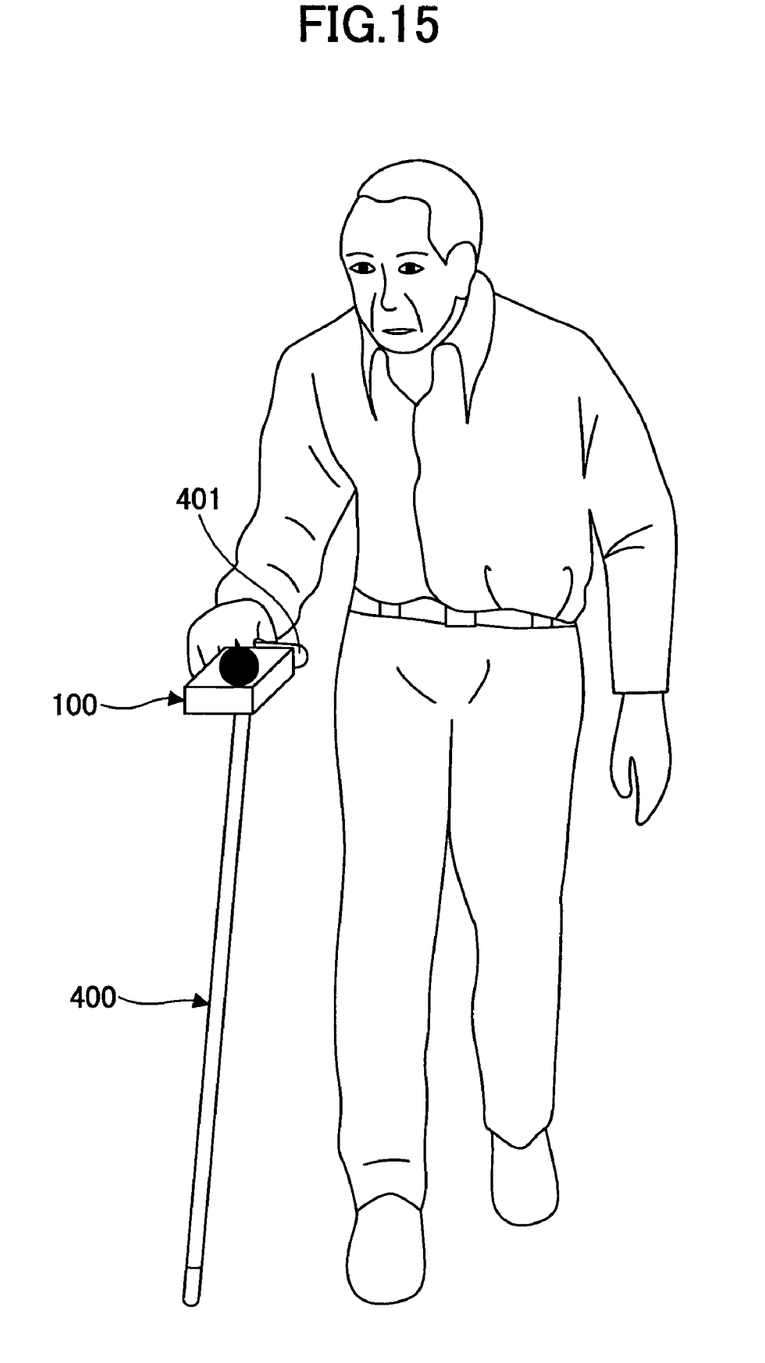
FIG. 15 is a schematic diagram showing a third example applying an embodiment of the present invention.

FIG. 15 is a schematic diagram showing a third example applying an embodiment of the present invention. In this example, an embodiment of the direction guiding apparatus 100 is mounted on a grip part 401 of a cane 400.

Further, the present invention is not limited to these embodiments, but variations and modifications may be made without departing from the scope of the present invention.

The present application is based on Japanese Priority Application No. 2007-162632 filed on Jun. 20, 2007, with the Japanese Patent Office, the entire contents of which are hereby incorporated by reference.

What is claimed is:

1. A direction guiding apparatus for indicating a guidance direction to a user, the direction guiding apparatus comprising:
    an operation device having an operations part movable on an operation plane;
    a control part for transmitting control data to the operation device for controlling the movement of the operations part; and
    wherein the guidance direction is distinguishable by the movement of the operations part, and
    wherein when the control part detects the operations part deviating from a guidance direction axis on the operation plane, the control part transmits return control data to the operation device for forcing the operations part to return to the guidance direction axis.

2. The direction guiding apparatus as claimed in claim 1, wherein the operations part is configured to linearly reciprocally move with respect to the guidance direction, wherein the speed of the linear reciprocal movement is different depending on whether the operations part is moving in an advancing direction or a returning direction.

3. The direction guiding apparatus as claimed in claim 1, wherein the operations part is configured to linearly reciprocally move with respect to the guidance direction, wherein the operations part is configured to non-linearly move at one end of a path of the linear reciprocal movement.

4. The direction guiding apparatus as claimed in claim 3, wherein the speed of the linear reciprocal movement is different depending on whether the operations part is moving in an advancing direction or a returning direction.

5. The direction guiding apparatus as claimed in claim 3, wherein the non-linear movement has a stroke smaller than that of the linear reciprocal movement.

6. The direction guiding apparatus as claimed in claim 1, wherein the operations part is configured to reciprocally move with respect to the guidance direction, wherein the operations part moves linearly when moving in an advancing direction and moves arcuately when moving in a returning direction.

7. The direction guiding apparatus as claimed in claim 6, wherein the operations part is configured to non-linearly move at one end of a path of the reciprocal movement.

8. The direction guiding apparatus as claimed in claim 1, wherein when the control part detects the operations part situated on a guidance direction axis on the operation plane, the control part transmits tactile sense control data to the operation device for enabling the operations part to convey a tactile sense indication.

9. A direction guiding method for indicating a guidance direction to a user, the direction guiding method comprising:
    a) moving an operations part of an operation device on an operation plane;
    b) transmitting control data to the operation device for controlling the movement of the operations part;
    c) detecting whether the operations part is situated on a guidance direction axis; and
    d) transmitting return control data to the operation device for forcing the operations part to return to the guidance direction axis wherein when the operations part is detected deviating from the guidance direction axis on the operation plane, and
    wherein the guidance direction is distinguishable by the movement of the operations part.

10. The direction guiding method as claimed in claim 9, wherein step a) includes linearly reciprocally moving the operations part with respect to the guidance direction, wherein the speed of the linear reciprocal movement is different depending on whether the operations part is moving in an advancing direction or a returning direction.

11. The direction guiding method as claimed in claim 9, wherein step a) includes linearly reciprocally moving the operations part with respect to the guidance direction and non-linearly moving the operations part at one end of a path of the linear reciprocal movement.

12. The direction guiding method as claimed in claim 11, wherein the speed of the linear reciprocal movement is different depending on whether the operations part is moving in an advancing direction or a returning direction.

13. The direction guiding method as claimed in claim 11, wherein the non-linear movement has a stroke smaller than that of the linear reciprocal movement.

14. The direction guiding method as claimed in claim 9, wherein step a) includes reciprocally moving the operations part with respect to the guidance direction, wherein the operations part is moved linearly when moving in an advancing direction and is moved arcuately when moving in a returning direction.

15. The direction guiding method as claimed in claim 14, wherein step a) further includes non-linearly moving the operations part at one end of a path of the reciprocal movement.

16. The direction guiding method as claimed in claim 9, further comprising:
    transmitting tactile sense control data to the operation device for enabling the operations part to convey a tactile sense indication.

* * * * *